United States Patent [19]

Makabe et al.

[11] 4,200,048

[45] Apr. 29, 1980

[54] ELECTRONIC SEWING MACHINE

[75] Inventors: Hachiro Makabe, Fussa; Kazuo Watanabe, Hachioji, both of Japan

[73] Assignee: Janome Sewing Machine Co., Ltd., Tokyo, Japan

[21] Appl. No.: 894,332

[22] Filed: Apr. 7, 1978

[30] Foreign Application Priority Data

Apr. 15, 1977 [JP] Japan ................................. 52-42524

[51] Int. Cl.[2] ............................................... D05B 3/02

[52] U.S. Cl. ................................................ 112/158 E

[58] Field of Search .......... 112/158 E, 121.11, 121.12, 112/275, 277

[56] References Cited

U.S. PATENT DOCUMENTS 3,987,739 10/1976 Wurst et al. ..................... 112/158 E 4,051,794 10/1977 Herzer et al. ................... 112/121.12

4,122,786 10/1978 Tanimoto et al. ............... 112/158 E

FOREIGN PATENT DOCUMENTS 2746946 4/1978 Fed. Rep. of Germany ....... 112/158 E

*Primary Examiner*—Peter P. Nerbun

*Attorney, Agent, or Firm*—Michael J. Striker

[57] ABSTRACT

A plurality of different stitch patterns are stored in a first static memory. Using a second static memory, the user can cause the second static memory to memorize indications of different combinations and sequences of the stitch patterns memorized in the first static memory, so as to be able to establish further automatically sewn stitch patterns constituted by differently selected combinations of the stitch patterns stored in the first memory. Also, the second memory can be used to invert individual ones of the stitch patterns in the first memory, either with respect to a line extending in the direction of material feed or with respect to the direction perpendicular thereto.

3 Claims, 11 Drawing Figures

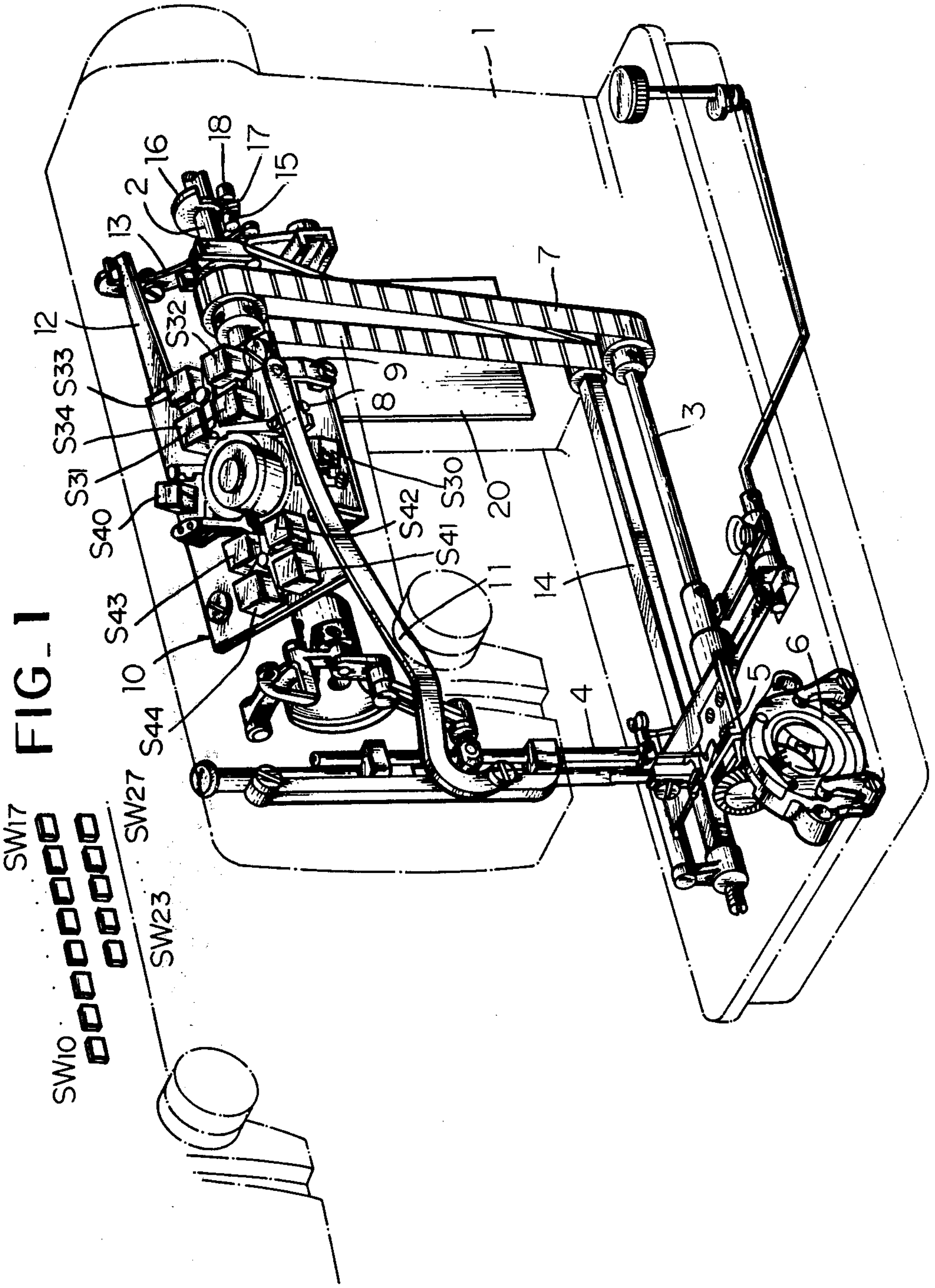
FIG_1

FIG_2
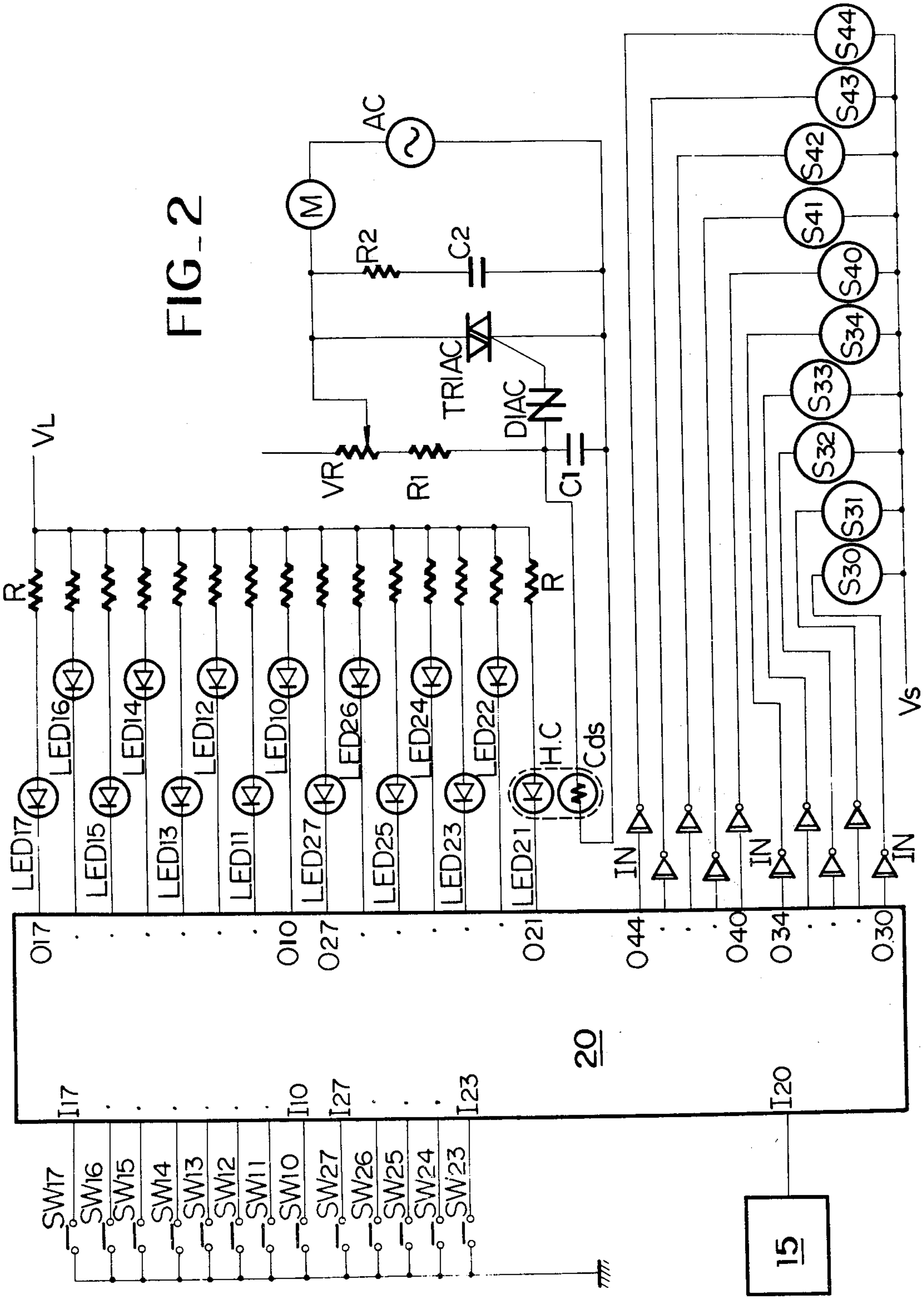

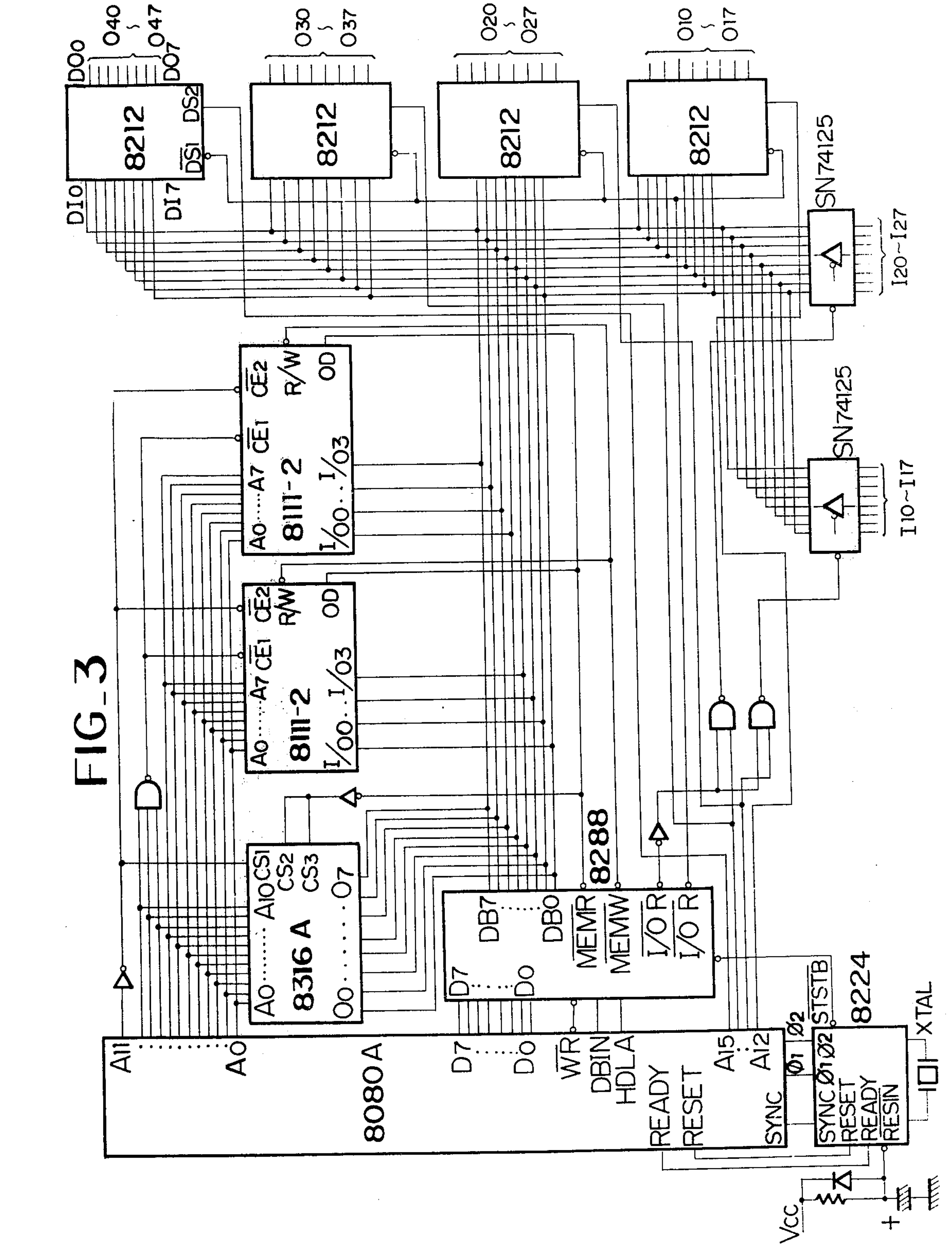
FIG_3

FIG_4

| Code | Needle coordinate | Feed coordinate | Code | Needle coordinate | Feed coordinate |
|---|---|---|---|---|---|
| 00000 | 0 | -15 | 10000 | 16 | +1 |
| 00001 | 1 | -14 | 10001 | 17 | +2 |
| 00010 | 2 | -13 | 10010 | 18 | +3 |
| 00011 | 3 | -12 | 10011 | 19 | +4 |
| 00100 | 4 | -11 | 10100 | 20 | +5 |
| 00101 | 5 | -10 | 10101 | 21 | +6 |
| 00110 | 6 | -9 | 10110 | 22 | +7 |
| 00111 | 7 | -8 | 10111 | 23 | +8 |
| 01000 | 8 | -7 | 11000 | 24 | +9 |
| 01001 | 9 | -6 | 11001 | 25 | +10 |
| 01010 | 10 | -5 | 11010 | 26 | +11 |
| 01011 | 11 | -4 | 11011 | 27 | +12 |
| 01100 | 12 | -3 | 11100 | 28 | +13 |
| 01101 | 13 | -2 | 11101 | 29 | +14 |
| 01110 | 14 | -1 | 11110 | 30 | +15 |
| 01111 | 15 | 0 | 11111 | RET | |

FIG_5
| Address | Data |
|---|---|
| 0 0 0 | Indication data |
| 0 0 1 | Page designating data |
| 0 0 2 | Address designating data |
| 0 0 3 | Function switch data |
| 0 0 4 | End indication data |
| 0 0 5 | |
| | |
FIG_6
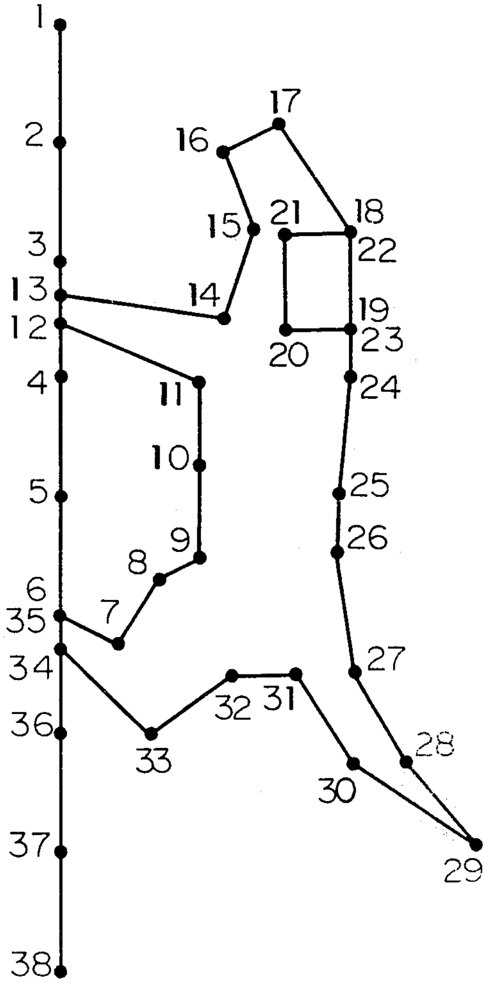

FIG_7

| Stitch | Needle swing movement | | Feeding movement | |
|---|---|---|---|---|
| | Coordinate | Code | Coordinate | Code |
| 1 | 0 | 00000 | 12 | 11011 |
| 2 | 0 | 00000 | 12 | 11011 |
| 3 | 0 | 00000 | 12 | 11011 |
| 4 | 0 | 00000 | 12 | 11011 |
| 5 | 0 | 00000 | 12 | 11011 |
| 6 | 0 | 00000 | 3 | 10010 |
| 7 | 4 | 00100 | -7 | 01000 |
| 8 | 7 | 00111 | -2 | 01101 |
| 9 | 10 | 01010 | -9 | 00110 |
| 10 | 10 | 01010 | -9 | 00110 |
| 11 | 10 | 01010 | -6 | 01001 |
| 12 | 0 | 00000 | -3 | 01100 |
| 13 | 0 | 00000 | 3 | 10010 |
| 14 | 12 | 01100 | -9 | 00100 |
| 15 | 14 | 01110 | -8 | 00111 |
| 16 | 12 | 01100 | -3 | 01100 |
| 17 | 16 | 10000 | 11 | 11010 |
| 18 | 21 | 10101 | 10 | 11001 |
| 19 | 21 | 10101 | 0 | 01111 |
| 20 | | | | |
| 35 | | | | |
| 36 | 0 | 00000 | 12 | 11011 |
| 37 | 0 | 00000 | 12 | 11011 |
| 38 | 0 | 00000 | 12 | 11011 |

FIG_8

| Address | Data | Address | Data | Address | Data | Address | Data |
|---|---|---|---|---|---|---|---|
| 000 | RET | 059 | | 118 | B6 | 177 | F10 |
| 001 | B1 | 060 | | 119 | F6 | 178 | B11 |
| 002 | F1 | 061 | | 120 | B7 | 179 | F11 |
| 003 | B1 | 062 | | 121 | F7 | 180 | B12 |
| 004 | RET | 063 | | 122 | B8 | 181 | F12 |
| 005 | | 064 | | 123 | F8 | 182 | B13 |
| 006 | | 065 | | 124 | B9 | 183 | F13 |
| 038 | | 097 | | 156 | B1 | 215 | F29 |
| 039 | | 098 | | 157 | RET | 216 | B30 |
| 040 | | 099 | | 158 | B1 | 217 | F30 |
| 041 | | 100 | | 159 | F1 | 218 | B31 |
| 042 | | 101 | | 160 | B2 | 219 | F31 |
| 043 | | 102 | | 161 | F2 | 220 | B32 |
| 044 | | 103 | | 162 | B3 | 221 | F32 |
| 045 | | 104 | | 163 | F3 | 222 | B33 |
| 046 | | 105 | | 164 | B4 | 223 | F33 |
| 047 | | 106 | | 165 | F4 | 224 | B34 |
| 048 | | 107 | RET | 166 | B5 | 225 | F34 |
| 049 | | 108 | B1 | 167 | F5 | 226 | B35 |
| 050 | | 109 | F1 | 168 | B6 | 227 | F35 |
| 051 | | 110 | B2 | 169 | F6 | 228 | B36 |
| 052 | | 111 | F2 | 170 | B7 | 229 | F36 |
| 053 | | 112 | B3 | 171 | F7 | 230 | B37 |
| 054 | | 113 | F3 | 172 | B8 | 231 | F37 |
| 055 | | 114 | B4 | 173 | F8 | 232 | B38 |
| 056 | | 115 | F4 | 174 | B9 | 233 | F38 |
| 057 | | 116 | B5 | 175 | F9 | 234 | B1 |
| 058 | | 117 | F5 | 176 | B10 | 235 | RET |

FIG_9
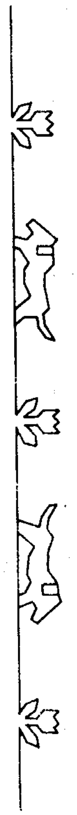
FIG_10

FIG_11

| Type of stitches | Address | Data |
|---|---|---|
| Bar- tack 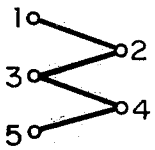  | 0 0 0<br>0 0 1<br>0 0 2<br>0 0 3 | Indication data (SW13)<br>Page designating data<br>Address desginating data<br>Memory Indication data |
| Left side line-tack   | 0 0 4<br>0 0 5<br>0 0 6<br>0 0 7 | Indication data (SW14)<br>Page designating data<br>Address desginating data<br>Memory Indication data |
| Bar - tack 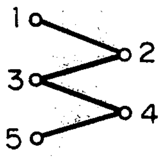  | 0 0 8<br>0 0 9<br>0 1 0<br>0 1 1 | Indication data (SW13)<br>Page designating data<br>Address desginating data<br>Memory Indication data |
| Right side line - tack 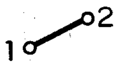  | 0 1 2<br>0 1 3<br>0 1 4<br>0 1 5 | Indication data (SW15)<br>Page designating data<br>Address desginating data<br>Memory Indication data |
| | 0 1 6 | Left side stitch counting data |
| | 0 1 7 | Rightside stitch counting data |

ELECTRONIC SEWING MACHINE

BRIEF DESCRIPTION OF THE INVENTION

The present invention relates to an electronic sewing machine with a pattern forming system the stitches in a pattern by relative displacement of the needle and the sewn material. In this invention, a semiconductor memory is employed for storing stitch control signals which can be used in groups to produce a plurality of patterns. Further in this invention, pattern selecting switches and function switches are selectively operated to use the stitch control signals for producing individual stitch patterns, or to use these signals in a desired combination for producing a set of patterns, or to use these signals for inverting the set of patterns as well as the individual patterns in the feeding direction and around a vertical axis in the region of the needle swinging movement. Further those switches are selectively operated to use these signals for producing button hole stitches.

The recent widely used sewing machines are provided with a mechanical memory such as the disc cams. Such a mechanical memory becomes bulky for a limited space of a sewing machine as the stored data increases in response to the desire of the consumer. Regarding the sewing machines provided with a semiconductor memory, it has been desired that the stored data must be effectively used to produce various types of patterns with an easy setting operation.

The present invention has been provided to eliminate the defects and disadvantages of the prior art and to satisfy the desire of the consumer.

It is a primary object of the invention to effectively use the data stored in the semiconductor memory for the purpose of producing various types of stitch patterns.

It is another object of the invention to temporally store pattern data in a RAM so as to make up a table of variously combined data for reading out the data in the semiconductor memory (ROM) in accordance to the data table.

It is another object of the invention to provide pattern selecting switches and function switches to make up such a table of combined data.

It is another object of the invention to provide an additional function switch to use the pattern data for producing a pattern inverted in the feeding direction.

It is still another object of the invention to provide a further additional function stitch to use the pattern data for producing a pattern inverted around a vertical axis in the region of the needle swinging movement.

The further features and advantages of the invention will be apparent from the following description of the preferred embodiment of the invention in reference to the attached drawings.

BRIEF EXPLANATION OF THE DRAWINGS;

FIG. 1 is a sewing machine of the invention, partly omitted to clearly show the invention, FIG. 2 is a control circuit diagram of the invention, FIG. 3 is a part of FIG. 2 represented in detail, FIG. 4 is a table showing the relations of stitch coordinates and codes in accordance to the invention, FIG. 5 is a table showing the way of storing a set of patterns to be stitched, FIG. 6 is a pattern actually stitched by the invention in accordance to the stitch numbers, FIG. 7 is a table showing the relations of the stitch coordinates, the codes and the stitch numbers in FIG. 6, FIG. 8 is a static memory storing the addresses and the corresponding stitch data, FIGS. 9 and 10 are two sets of patterns actually stitched by the invention; and FIG. 11 is a table showing the way of storing the data for stitching a button hole.

In reference to the sewing machine in FIG. 1, the reference numeral (1) designates a machine housing. The numeral (2) is an upper shaft and (3) is a lower shaft. The numeral (4) is a needle bar with a needle at the lower end thereof. The numeral (5) is a feed dog to feed a sewn material and (6) is a loop taker. Now if the upper shaft (2) is driven by an electric motor, the needle bar (4) is vertically reciprocated through the crank mechanism, and the lower shaft (3) is rotated through the timing belt (7) to rotate the loop taker. The reference numeral (10) denotes a stitch control system which gives an output to actuate a swingable arm (8). The swinging movement of the arm (8) laterally swings the needle bar (4) through another swingable arm (9) and a transmission rod (11). The stitch control system also actuates an arm (12) which swings a lever (13). The swinging movement of the arm (13) is transmitted to the feed dog (5) through a transmission rod (14). The stitch control system (10) is operated by the stitch control signals produced from a program control unit (20) in FIG. 2 to regulate the movements of the needle bar (4) and the feed dog (5).

The reference numeral (15) denotes a photo-transistor mounted on the machine housing, which receives a light from a luminous diode (18) through a cutout (17) of a shutter plate (16) fixedly mounted on the upper shaft (2) for rotation therewith, thereby to give a signal to the program control unit (20) in synchronism with rotation of the upper shaft. (SW10)–(SW17) and (SW23)–(SW27) are pattern selecting switches and function switches respectively for selection of a desired pattern and for a desired combination of patterns. The stitch control system (10) consists of an adder mechanism (not shown) and a set of solenoids (S30)–(S34) for controlling the needle bar swinging movement. The stitch control system (10) further consists of another adder mechanism (not shown) and another set of solenoids (S40)–(S44) for controlling the feeding movement of the feed dog (5). These two sets of solenoids are independently actuated to give the swingable arm (8) and the lever (12) the relative ratios 1:2:4:8:16 respectively, thereby to give the added shift amounts from 0 to 31 to the needle bar (4) and to the feed dog (5).

In reference to FIG. 2 showing the program control unit (20) which is formed up as shown in FIG. 3 in accordance with the 8080 system of the INTEL company. The program control unit (20) includes a memory (ROM 8316A) with the read only bits of 2KX8, and a set of memories (RAM 8111-2) with the reading and inscribing bits of 256×8, and also includes, as the inputs thereof, two chips of tristate buffers (SN74125) with the input terminals ($I_{10}$)–($I_{17}$) and another two chips of tristate buffers (SN74125) with the input terminals ($I_{20}$)–($I_{27}$), and as the outputs thereof four chips of I/O gates with the output terminals ($O_{10}$)–($O_{17}$), ($O_{20}$)–($O_{27}$), ($O_{30}$)–($O_{37}$) and ($O_{40}$)–($O_{47}$). These numbers of four or five figures with attached number or letters are the product numbers of the INTEL company or standards. In this case, the bits unused in FIG. 2 are not shown. (8080A) is a micro-processor. (8228) is a system controller. (8224) is a clock generator.

The 5-bit signals as shown in FIG. 4 are stored in the ROM(8316A) and issued from the output terminals $(O_{30})$-$(O_{34})$ and $(O_{40})$-$(O_{44})$ to actuate the solenoids $(S_{30})$-$(S_{34})$ and $(S_{40})$-$(S_{44})$, thereby to control the needle swinging movement and the feeding movement of the feed dog respectively in accordance to the coordinates of the needle and feed dog positions. As shown in FIG. 4, 0 corresponds to the left end position of the needle, and 30 corresponds to the right end position of the needle. +15 corresponds to the forward maximum feeding (2.5 mm) of the feed dog, and −15 corresponds to the backward maximum feeding (2.5 mm) of the feed dog. The code 11111 is a return code (RET). When the code is issued, the program counter in the microprocessor (8080A) is set to count back the initial address for stitching the initial stitch of the selected pattern.

The pattern selecting switches (SW10)-(SW17) are each grounded at one end thereof and connected at the other end thereof to the input terminals $(I_{10})$-$(I_{17})$ of the program control unit (20). The switches are selectively operated to produce the corresponding stitch patterns. The switch (SW10) of these switches is adapted to produce straight stitches. The function switches (SW23)-(SW27) are each grounded at one end thereof and connected at the other end thereof to the input terminals $(I_{23})$-$(I_{27})$ of the program control unit (20). The function switch (SW23) is a one-cycle pattern stitching switch operated, together with a single or combined pattern selecting switches, to produce such a single or combined patterns once with each operation of the machine controller. The function switch (SW24) is operated to invert the selected pattern from right to left or vice versa. The function switch (SW25) is operated to invert the selected pattern from front to back or vice versa in the feeding direction as shown by the dog pattern in FIG. 9 by way of example. The function switch (SW26) is operated to cause the RAM (8111-2) to register the fact that a single one or a combination of the pattern selecting switches and the inverting function switches (SW24), (SW25) have been operated. The function switch (SW27) is a back stitching switch which is kept operated to invert the selected pattern in the feeding direction, namely the pattern is stitched with reverse feeding or is traced back by the needle stitch by stitch.

The phototransistor (15) is connected to the input terminal $(I_{20})$ of the program control unit (20) as shown in FIG. 2. (LED10)-(LED17) and (LED23)-(LED27) are so many light emitting diodes to indicate that the pattern selecting switches (SW10)-(SW17) and the function switches (SW23)-(SW27) are selectively operated. (LED22) is a light emitting diode to indicate the overflow of the capacity of the RAM(8111-2). These indicator diodes are to be arranged on the outside of the machine housing, and are each connected at one end thereof to the output terminals $(O_{10})$-$(O_{17})$ and $(O_{22})$-$(O_{27})$ respectively of the program control unit (20) and connected at the other end thereof to the indicating power source (VL) through the respective resistors (R)—(R). (H.C) is a photo-coupler which gives a light, at the termination of one cycle pattern stitching, to short-circuit the capacitor (C1) through the light conducting element (CdS), thereby to render the triac (TRIAC) inconductive. As the result, the electric current to the machine motor (M) is blocked, and the sewing machine is stopped.

(VR) is a motor speed varying resistor and (R1) is a fixed resistor. (DIAC) is a diac for triggering the triac. (R2) and (C2) are a resistor and a capacitor to protect the triac. (AC) is a power source for the machine motor (M). (S30)-(S34) and (S40)-(S44) are the aforementioned two sets of solenoids for controlling the needle bar and the feed dog respectively. These solenoids are each connected at one end thereof to the power source (Vs) and connected at the other end thereof to the output terminals $(O_{30})$-$(O_{34})$ and $(O_{40})$-$(O_{44})$ of the program control unit (20) respectively through the respective inverters (IN)—(IN). These solenoids are operated selectively in combinations by the output signals of the program control unit (20).

In reference to FIGS. 2 and 3, if the power source (Vcc) of the program control unit (20) is switched on, the program counter in the microprocessor (8080A) is set to 0, so that the program may be performed from the 0 page. Such a set condition of the program counter equivalently provides straight stitches. Namely only the lamp (LED10) is lit, and the output terminals $(O_{30})$-$(O_{34})$ and $(O_{40})$-$(O_{44})$ of the program control unit (20) become all L level. Therefore none of the solenoids $(S_{30})$-$(S_{34})$ and $(S_{40})$-$(S_{44})$ is operated, and a signal for straight stitches is repeatedly read out from the ROM(8316A) with each rotation of the upper shaft of the sewing machine. Accordingly the straight stitches are obtained with the manual operation of the machine controller. The selective operation of the pattern selecting switches (SW10)-(SW17) is confirmed several times by the program control unit (20). If more than one pattern selecting switch is operated at a given time, the switch with the higher reference numeral becomes effective and the other switch or switches will be cancelled. The selective operation of the function switches (SW23)-(SW27) is also confirmed in the same way as the pattern selecting switches. But if plural function switches are operated at the same time both will be cancelled.

The RAM(8111-2) stores the operated conditions of the pattern selecting switches (SW10)-(SW17) and the function switches (SW23)-(SW27), and also forms the relations of addresses and data as shown in FIG. 5 to produce a set of patterns. FIG. 5 shows only a part of such relations, in which the addresses are represented by decimal numbers. Each selective operation of the switches (SW10)-(SW17) and (SW23)-(SW27) advances the decimal numbers to inscribe the data in FIG. 5. Namely prior to stitching a pattern, if one of the pattern selecting switches (SW10)-(SW17) is operated, the indication data is inscribed in correspondence to the address 000 to light a selected one of the light emitting diodes (LED10)-(LED17). Simultaneously the page designating data is inscribed in correspondence to the address 001 to designate the page of the stitch control signals stored in the ROM(8316A) and corresponding to the operation of the selected pattern selecting switch. Further simultaneously the designating address is inscribed in correspondence to the address 002 to designate the initial address of the designated page. Subsequently if one of the function switches (SW23)-(SW27), except for the memory switch (SW26), is operated, the function indicating data is inscribed in correspondence to the address 0 0 3 to light one of the light emitting diodes (LED23)-(LED27). Simultaneously the microprocesser (8080A) proceeds to perform the function determined by the selected function switch. If the function switch is not operated, the data 0 0 0 0 0 0 0 0 is inscribed. Subsequently if the memory switch (SW26) is operated and then one of the pattern selecting switches (SW10)-(SW17) is operated again, the second selected pattern data is inscribed in correspondence to the address 0 0 4. Thus in the same way the next page designating data is inscribed in correspondence to the address 0 0 5, and the designating address is inscribed in correspondence to the address 0 0 6. If the second pattern is not selected, the end code is inscribed in correspondence to the address 0 0 4. If the second pattern is selected and the third pattern is not selected after the memory switch (SW26) has been operated, the end code is inscribed as well in the corresponding address. Such an end code (or data) is inscribed after the sewing machine has started the switching operation. If these switches are operated during the stitching operation of the sewing machine, the previously inscribed data are reset and the pattern is produced in accordance to the last operated switches.

According to the invention, at least ten types of patterns are selected in the RAM (8111-2) in accordance to the table in FIG. 5. If more patterns are inscribed, the overflow indication diode (LED22) is lit to indicate that the RAM's are full of the data. Regarding the readout of the RAM, and accordingly the readout of the ROM (8316A), the I/O gates (8212) are of a latch type, and the output terminals (0 10)-(0 44) of the program control unit (20) in FIG. 2 are maintained until a new data is produced by manual operation of the switches or by rotation of the sewing machine. Therefore, the pattern indication lamps (LED10)-(LED17) indicate the pattern each time as it changes.

FIG. 6 shows a dog pattern and the stitch numbers which can be sewn in the invention. FIG. 7 shows the coordinates and codes of these stitch numbers. FIG. 8 shows the data in the ROM (8316A) together with the stitch numbers. In this embodiment of the invention, if the page indicating data in the address 0 0 1 or 0 0 5 in FIG. 5 designates, for example, page 7, the data group of FIG. 8 is selected in the ROM (8316 A). In FIG. 8, the addresses are those of ROM (8316A); the letters B are data in the ROM for controlling the needle swinging movement; and the letters F are the data for controlling the feeding movement of the feed dog; the attached numbers are the stitch numbers, for example, in FIG. 6; and the mark (RET) is a signal to repeatedly return the address to the initial stitch of the pattern after the pattern has been stitched. The mark (RET) is also arranged just before the initial stitch of the pattern so as to invert the pattern in the forward or backward direction. The addresses from 158 to 234 correspond to the pattern stitches in FIG. 6, the addresses from 0 0 1 to 0 0 3 correspond to the straight line stitches, the addresses from 108 to 156 correspond to the flower pattern stitches in FIGS. 9 and 10, and the blanks indicates the omission of the data.

With the foregoing combination of elements and data, a set of four patterns is stitched in FIG. 9 in which the bottom flower pattern is the initial one when the set of patterns is repeatedly stitched. In FIG. 9, the flower pattern is stitched by operation of the pattern selecting switch (SW16), and the dog pattern is stitched by operation of the pattern selecting switch (SW17). In reference to FIGS. 1 and 2, if the power source (Vcc) is switched and the pattern selecting switch (SW16) is operated the address 0 0 0 in FIG. 5 is inscribed with the indicating data 1 0 1 1 1 1 1 1, thereby to light the pattern indicating lamp (LED16); the address 0 0 1 is inscribed with the page designating data designating page 7 as shown in FIG. 8; the address 0 0 2 is inscribed with the data designating the address 108 shown in FIG. 8; and the address 0 1 1 is inscribed with the function switch data 0. Then if the memory switch (SW26) is operated, the following operation of the other switches inscribe the corresponding data in the address 0 0 4 and in the following addresses in the same manner. Namely if the pattern switch (SW17) is operated, the address 0 0 4 in FIG. 5 is inscribed with the pattern indicating data 0 1 1 1 1 1 1 1, thereby to light the indicating lamp (LED 17); the address 0 0 5 is inscribed with the page designating data designating page 7 shown in FIG. 8; the address 0 0 6 is inscribed with the data designating the address 158; and the address 0 0 7 is inscribed with the function switch data 0. Then the memory switch (SW26) is operated. Subsequently if the pattern selecting switch (SW16) is operated, the address 0 0 8 in FIG. 5 is inscribed with the indicating data 1 0 1 1 1 1 1 1, thereby to light the pattern indicating lamp (LED16); the address 0 0 9 is inscribed with the page designating data designating page 7 as shown in FIG. 8; the address 0 1 0 is inscribed with the data designating the address 108; and the address 0 1 1 is inscribed with the function switch data 0. Then the memory switch (SW26) is operated. Subsequently if the pattern selecting switch (SW17) and the pattern inverting switch (SW25) are operated one after another, the address 0 1 2 in FIG. 5 is inscribed with the indicating data 0 1 1 1 1 1 1 1, thereby to light the pattern indicating lamp (LED17); the address 0 1 3 is inscribed with the page designating data designating the page 7 as shown in FIG. 8; the address 0 1 4 is inscribed with the data designating the address 234 in FIG. 8, though the address 0 1 4 is once inscribed with the address 1 5 8 before the pattern inverting switch (SW25) is operated, because the function switch data to the address 0 1 5 includes the bits determining the inversion of the pattern in the feeding direction, and the bits become high level to cause the microprocesser (8080A) to advance the addresses in FIG. 8 to the address 235 having the data RET, but returns one address to 234; and the address 015 is inscribed with the function switch data to light the indicating lamp (LED25). Thus the microprocesser (8080A) has a function to count down the addresses from the address 234 in FIG. 8. With the last operation of the memory switch (SW26), the series of data inscriptions performed by way of the switches is finished.

Now if the machine controller (not shown) is pressed to start a stitching operation, the address 016 in FIG. 5 is inscribed with the data indicating that the stitches of the set of patterns are terminated. The formation of the pattern stitches is initially made by the data sequentially read out from the addresses 0 0 0–0 0 3 in FIG. 5. With such data, the signal from the photo-transistor (15) per rotation of the sewing machine sequentially counts up the data B at the rise thereof and the data F at the fall thereof from the address 108 in FIG. 8, thereby to form stitches 1–24 in a flower pattern. In reading out the data F for controlling the movement of the feed dog, the data F is checked if the data is accompanied by a signal (RET) ordering a repeated stitching of a pattern. If the data F is accompanied by the signal (RET), the next data (B) is not read out. At any rate, when the twenty-four stitches have been formed in accordance to the data in FIG. 8, the following data for the next pattern are read out by the signal (RET) from the addresses 0 0 4–0 0 7 in FIG. 5, and the count-up is made from the address 158 to form stitches 1-38 in a dog pattern. Subsequently the data for the next flower pattern are read out from the addresses 0 0 8-0 1 1 in FIG. 5, and then the data for the next pattern are read out from the addresses 0 1 2-0 1 5, and the designating address 234 is attained. Then the addresses in FIG. 8 are counted down from the address 234 to the address 157 to form a pattern inverted in the feeding direction. At the address 157, the signal (RET) provides the address 0 1 6 in FIG. 5 indicating that the set of patterns has been formed. As the result, the address 0 0 0 is attained for repeating the same set of patterns. In this case, the indicating lamps (LED) are each lit to indicate the pattern as it changes during the formation of the set of patterns.

If the back stitching switch (SW27) is operated during the formation of the set of patterns, the indicating lamp (LED27) is lit. As the result, the microprocesser (8080A) traces back the addresses in FIG. 5 and counts down the addresses in FIG. 8 at the time the switch has been operated, and changes the forward feeding data F to the backward feeding data, and the backward feeding data to the forward feeding data. Namely the (+) coordinates in FIG. 4 are changed to the (−) coordinates and the (−) coordinates are changed to the (+) coordinates. Thus the set of patterns formed before the switch (SW27) was operated is traced back. Namely a back stitching of a pattern is carried out.

FIG. 10 shows a set of patterns inverted from right to left. Namely the patterns in FIG. 9 have been inverted into those in FIG. 10. In this case, if the pattern selecting switch (SW16) and the inverting switch (SW24) are operated, the indicating lamp (LED16) is lit in response to the address 0 0 0 in FIG. 5; the page 7 in FIG. 8 is designated in response to the address 0 0 1; the address 108 in FIG. 8 is designated in response to the address 0 0 2; and the indicating lamp (LED24) is lit in response to the address 0 0 3 in which the function switch data includes the bits determining the pattern inversion. These bits become high level to cause the microprocesser (8080A) to change the needle coordinates in FIG. 8. Namely the needle coordinate, for example, 0 is changed to 30 and the needle coordinate 1 is changed to 29, thereby to invert the pattern around a vertical axis within the region of needle swinging movement. The subsequent operations of the memory switch (SW26), the pattern selecting switch (SW17), the inverting switch (SW24) and the memory swtich (SW26) provide a set of patterns inverted from left to right or vice versa around a vertical axis within the region of the needle swinging movement as shown in FIG. 10.

FIG. 11 shows the inscriptions of data in RAM (8111-2) in the same way as those in FIG. 5 to form the stitches of a button hole. For selection of a button hole stitching, the switches (SW13), (SW14) and (SW15) are employed. A sub-routine is additionally provided, which is repeatedly implemented in accordance with the count data in the addresses indicated by the arrow marks. The inscription of FIG. 11 is made in the same way as in FIG. 5. Namely the bar-tack stitching switch (SW13), the memory switch (SW26) and the left side line-tack stitching switch (SW14), and then the memory switch (SW26) are operated one after another. In the next step the sewing machine is rotated in accordance with the number of the left side bartack stitches to store the number of the pulses generated by the phototransistor (15) during rotation of the sewing machine. Then the bar-tack stitching switch (SW13), the memory switch (SW26), the right side line-tack stitching switch (SW15), and then the memory switch (SW26) are operated one after another. In the next step the sewing machine is again rotated in accordance with the number of the right side line-tack stitches to store the number of the pulses generated from the photo-transistor (15), and in the last step, the memory switch (SW26) is operated. In this invention, the sub-routine is so programmed as to count and store the number of the stitches in the addresses 0 1 6 and 0 1 7, thereby to determine the number of the left and right side line-tack stitches. The sub-routine is not performed in the process of storing the other stitch patterns.

Now if the sewing machine is rotated through operation of the machine controller (not shown), the first bar-tack stitches of a button hole are stitched from 1 to 5 as shown. Subsequently the left side line-tack stitches 1 and 2 are repeatedly formed in accordance with the stored number of pulses from the phototransistor (15). After that, the second bar-tack stitches 1-5 are stitched, and subsequently the right side line-tack stitches 1 and 2 are repeatedly formed in accordance with the stored number of pulses from the photo-transistor (15). Thus a complete button hole is stitched, and such a button hole is repeatedly stitched substantially in the same way as in the set of patterns shown in FIGS. 9 and 10.

We claim:

1. A sewing machine with stitch forming and feeding instrumentalities and means for varying the relative positions of the needle and the sewn material to produce the stitches in a pattern, comprising static memory means storing stitch control data for controlling at least one of the stitch forming and feeding instrumentalities; pattern selecting switches selectively operated by the machine operator to select a desired pattern; address means operated by selected ones of the switches to address the static memory means and to make effective the selected groups of the stitch control data; second static memory means for sequentially storing the selected groups of the stitch control data; and function switches selectively operated by the machine operator to operate the second static memory for sequentially reading out the groups of stitch control data from the first static memory means, whereby a set of patterns can be repeatedly produced.

2. A sewing machine as defined in claim 1, further comprising an additional function switch and a microprocesser to invert groups of needle control data of the stitch control data so as to produce a set of patterns inverted around a vertical axis in the region of the needle swinging movement.

3. A sewing machine as defined in claim 2, further comprising an additional function switch for inverting groups of feed control data of the stitch control data so as to produce a set of patterns inverted in the feeding direction.

* * * * *